Feb. 17, 1959 J. L. CULBERTSON 2,874,224

COMBINED TOLL AND FREE-SERVICE TELEPHONE TRUNKING SYSTEM

Filed March 29, 1954 2 Sheets-Sheet 1

COMBINED TOLL AND FREE-SERVICE TELEPHONE TRUNKING SYSTEM

Filed March 29, 1954 2 Sheets-Sheet 2

United States Patent Office 2,874,224

Patented Feb. 17, 1959

2,874,224

COMBINED TOLL AND FREE-SERVICE TELEPHONE TRUNKING SYSTEM

John L. Culbertson, Harvey, Ill., assignor to International Telephone and Telegraph Corporation, a corporation of Maryland Application March 29, 1954, Serial No. 419,150

8 Claims. (Cl. 179—18)

This invention relates to a combined toll and free-service telephone trunking system. Its principal object is to provide an arrangement for enhancing the practicability of any combined toll and free-service trunk group in a telephone system by giving toll calls priority over free-service calls during heavy traffic periods.

GENERAL DESCRIPTION

Relatively small groups of interexchange toll trunks and free-service trunks interconnecting the same exchanges are commonly combined into one trunk group to increase the traffic-carrying capacity of the trunks. Heretofore, combined toll and free-service trunk groups are often unsatisfactory because the local and relatively unimportant free-service calls often keep the combined trunks in use throughout a period of heavy traffic, thus temporarily precluding the handling of toll calls over the combined groups.

It is, consequently, a specific object of the invention to provide an arrangement for reserving for toll use a predetermined portion of the trunks of a combined toll and free-service trunk group when most of the trunks of the group are in use, while permitting unrestricted access to all of the trunks of the group at all other times.

It has been chosen to illustrate the invention as applied to an automatic telephone system employing a combined group of one-way trunks carrying both toll-traffic and free-service traffic from a first exchange to a second exchange. In the first exchange local selectors have access to the combined trunks for free-service calls, while toll calls reach the trunks from toll selectors.

A feature of the invention is that any trunk of the group may comprise, or be included in, the portion reserved for toll service, depending only upon that trunk being, or becoming, idle at any time when the reserve provision is active.

A further feature is that while the reserve provision is active, any trunk becoming idle is added to the portion of idle trunks reserved for toll use.

A further feature resides in the circuit arrangement wherein the trunk-test conductor used by the local selectors is a multiple of the test conductor used by the toll selectors, thereby insuring that seizure of one path immediately marks the other path busy. In this arrangement, with battery searching employed at both groups of selectors, an opening of the test-conductor multiple between the two paths by the reserve provision serves to mark all free-service paths busy.

Other objects and features will become apparent as the description progresses.

*The drawings*

Referring now to the drawings, comprising Figs. 1 to 4:

*General operation*

Figure 1:
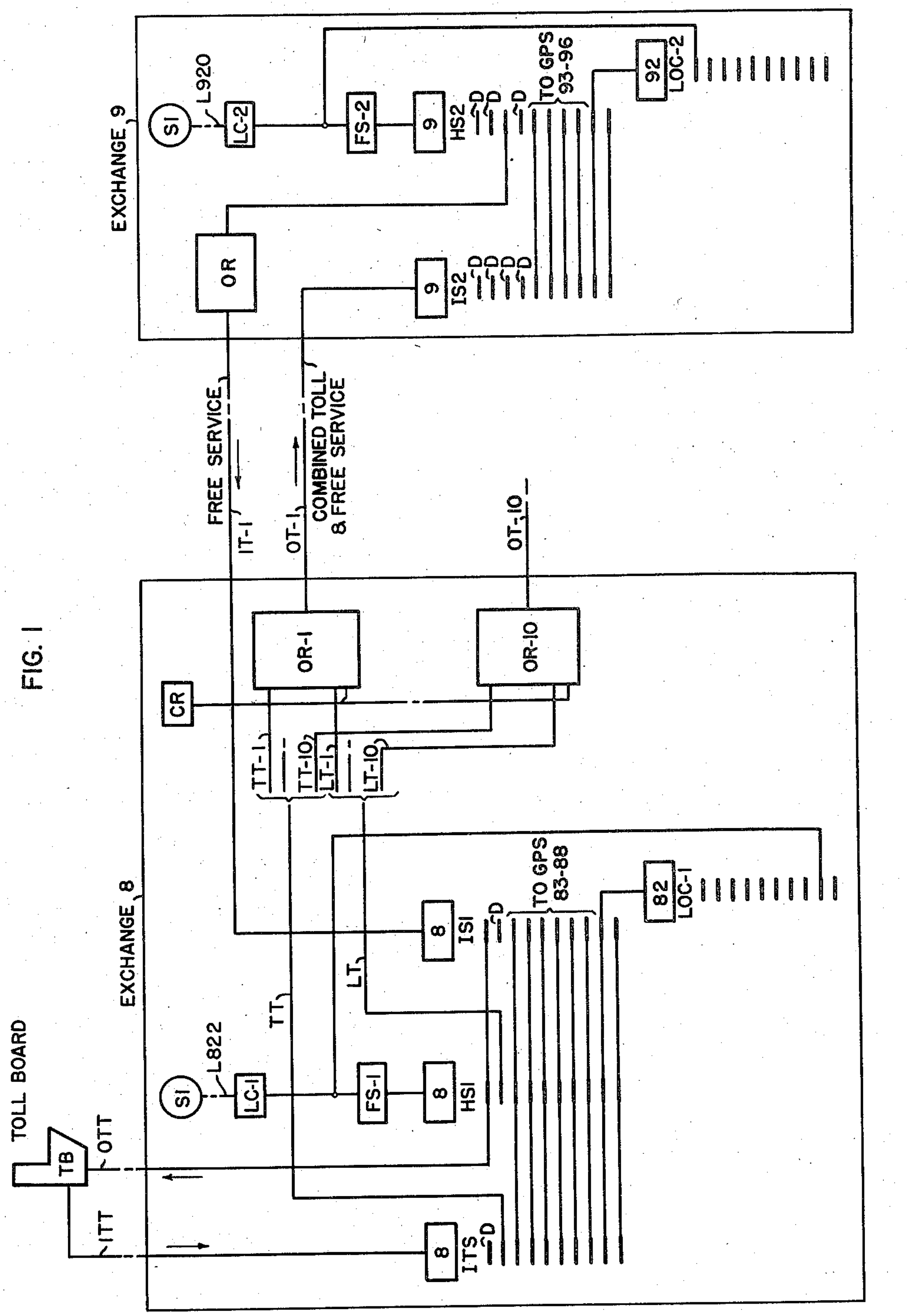
Fig. 1 is a single-line switching diagram of a multi-exchange automatic telephone system embodying the invention.

Referring now to Fig. 1 of the drawings, the general operation of the disclosed system in handling toll and free-service calls will be described.

Two exchanges 8 and 9 are shown interconnected by two groups of one-way trunk lines. Calls, either toll or free-service, from exchange 8 reach exchange 9 over one of the ten outgoing trung lines OT–1 to OT–10 of which only the first and last is indicated, and calls from exchange 9 reach exchange 8 over a free-service one-way trunk line such as IT–1, such trunk line being the only one illustrated.

Outgoing repeaters, such as OR–1 to OR–10 of exchange 8, are provided for each outgoing trunk line and are connected to respective originating ends thereof. The terminating end of each outgoing trunk line is connected to respective incoming selectors, selector IS2 being illustrated as associated with trunk line OT–1. Therefore, calls from exchange 8 to exchange 9 include an outgoing repeater OR–1, a trunk line OT–1, and an incoming selector IS2.

An outgoing repeater such as OR of exchange 9 is associated with the originating end of one of a group of trunk lines such as IT–1 and an incoming selector IS1 in exchange 8 is associated with the terminating end thereof. Calls from exchange 9 to exchange 8 include outgoing repeater OR, trunk line IT–1, and incoming selector IS1.

A toll board TB has access to the lines in exchange 8 over one-way toll trunk line ITT and associated incoming toll selector ITS. The toll board TB also has access to the lines in exchange 9 over an outgoing trunk line such as OT–1. Calls to the toll board TB are received over its one-way toll trunk OTT from lines in either of the two exchanges.

*Toll board calls exchange 8*

The toll operator desiring to call a subscriber at line 822 in exchange 8, makes connection to the incoming toll trunk line ITT and associated incoming toll selector ITS. The connection is thereafter extended to local connector LOC–1 and thence to the called line 822 in a manner well-known in the art.

*Toll board calls exchange 9*

The toll operator desiring to call a subscriber at line 920 in exchange 9, makes connection with trunk ITT and selector ITS as noted. The dialing of the digit 9 extends the connection over trunk branch TT to outgoing repeater OR–1 and thence over trunk line OT–1 to the incoming selector IS2 of exchange 9. Following the dialing of the digit 2, the connection is extended to local connector LOC–2 and thence to the called line L920 by usual connector operation.

*Exchange 8 calls toll board TB*

When line 822 of exchange 8 calls the toll board TB, line-finding action extends the calling line through the associated line circuit LC–1 and the finder switch FS–1 to the associated hundreds selector HS1. Responsive to the dialing of the trunk level assigned toll board TB, the connection from the calling line is thereupon extended over outgoing toll trunk OTT to the toll board TB and the toll operator is signalled in the normal manner.

*Exchange 8 calls exchange 9*

When line 822 of exchange 8 desires to call the subscriber at line 920 of exchange 9, line-finding action extends the connection from the calling line through the associated line circuit and finder switch to the associated hundreds register HS1, as above noted. Responsive to the dialing of the digit indexing exchange 9, the connection is further extended over the local trunk branch LT and through outgoing repeater OR–1 to the incoming selector IS2 over outgoing trunk line OT–1. The connection is thereupon extended to the local connector LOC–2 and thence to the called line L920 by connector action.

*Exchange 9 calls exchange 8*

When line 920 of exchange 9 desires to call a subscriber at line 822 in exchange 8, line-finding action extends to the calling line L920 through the associated line circuit LC–2 and the associated finder switch FS–2 to the hundreds selector HS2. Responsive to the dialing of the digit 8 indexing the call as one for exchange 8, the connection is thereupon extended through hundreds selector HS2, through outgoing repeater OR, and trunk line IT–1 to incoming selector IS1 of exchange 8. Following the dialing of the hundreds, tens and units digits indexing line 822 the connection is further extended through connector LOC–1 to the called line L822.

*Exchange 9 calls toll board TB*

When line 920 desires to call the toll board TB, line-finding action extends the calling line to the associated selector HS2 as hereinbefore noted. Responsive to the dialing of the digit 8 as above noted the connection is thereupon extended to incoming selector IS1 and is further extended to the toll board TB over toll trunk OTT responsive to the dialing of the digit 0 assigned the toll operator.

DETAILED DESCRIPTION

Figures 2, 4:
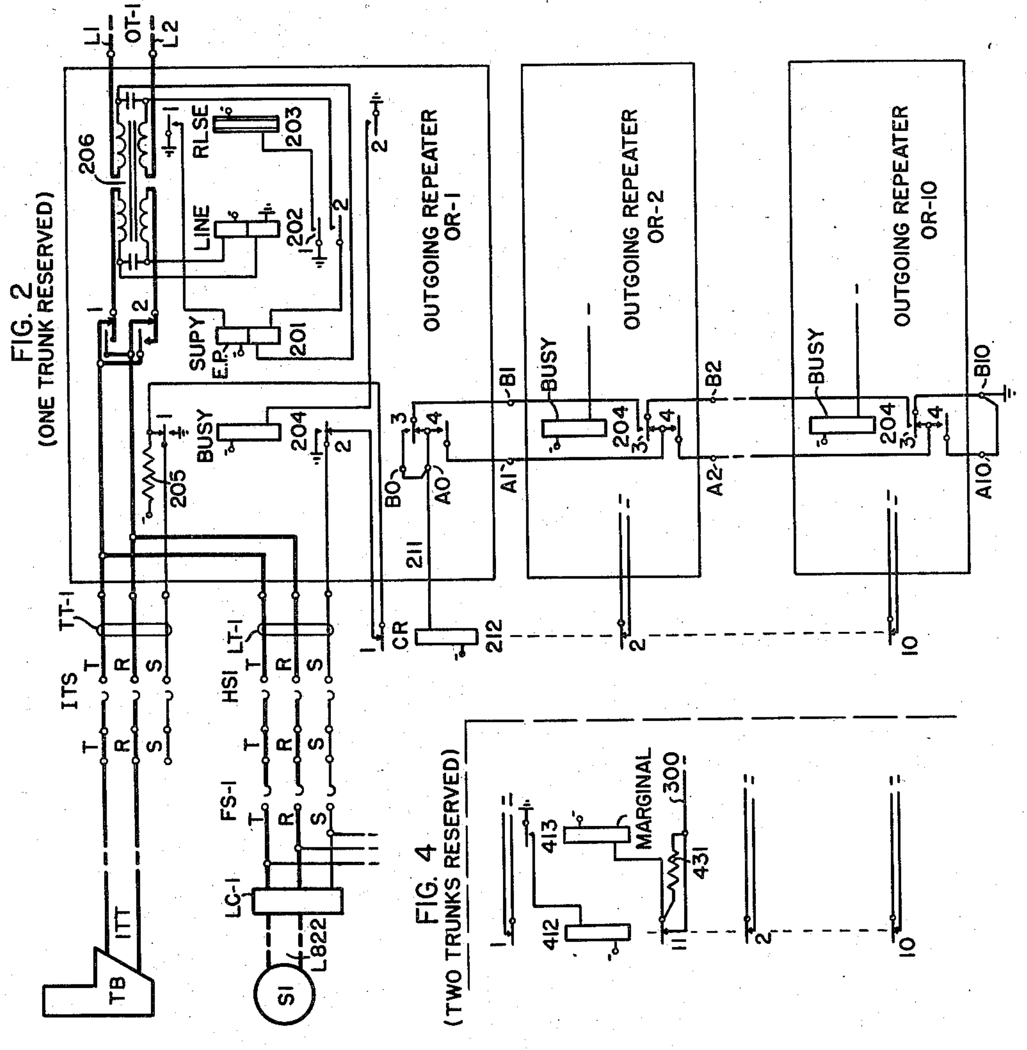
Fig. 2 is a circuit diagram of one embodiment of certain of the apparatus of Fig. 1.
Fig. 4 shows a desirable modification of the control circuits of Fig. 3.

Referring now to Fig. 2 of the drawings, a detailed description of the apparatus embodying the invention will be given.

Fig. 2 shows in more detail the apparatus indicated in Fig. 1. This part of the description covers in complete detail the operations of the outgoing repeaters in extending calls from the toll board TB to a subscriber at the exchange 9 and in extending calls from subscribers in exchange 8 to subscribers in exchange 9. Subsequent parts of the description cover the detailed operation of desirable modifications of the outgoing repeaters and the associated control equipment.

In Fig. 2 of the drawings it will be observed that only outgoing repeater OR–1 and the associated common control relay CR of Fig. 1 are shown in complete circuit detail, the other equipment being shown for purposes of completeness.

Outgoing repeater OR–1 handles both toll and locally originated calls received over respective trunk branches TT–1 and LT–1, and functions to extend calling connections to exchange 9 over an outgoing trunk line such as OT–1.

*Toll board TB calls exchange 9*

Sleeve conductor S of trunk branch TT–1 is normally supplied with idle-indicating battery potential through break contacts 1 of busy relay 204 and resistor 205, enabling outgoing repeater OR–1 to be seized over trunk branch TT–1 on calls from the toll board TB through the incoming toll selector ITS and incoming toll trunk ITT as hereinbefore pointed out.

When toll trunk branch TT–1 is seized, the bridged line conductors of the incoming toll trunk ITT are extended to conductors T and R of toll trunk branch TT–1, through incoming toll selector ITS, operating line relay 202 of outgoing repeater OR–1 through the normally-closed contacts 1 and 2 of supervisory relay 201 and the left-hand winding of repeating coil 206. Contacts 2 on line relay 202 bridge the lower winding of the electro-polarized supervisory relay 201 across the conductors of the associated interexchange outgoing trunk line OT–1 through the right-hand winding of repeating coil 206 and trunk line wires L1 and L2. This closed loop across the trunk conductors seizes the incoming selector IS2 of exchange 9 in the manner as hereinbefore described.

Contacts 1 of line relay 202 operate release relay 203. Contacts 1 of relay 203 energize the local winding of supervisory relay 201. Relay 201 does not operate at this time as the current flow through the windings is in opposing relationship until the call is answered.

Contacts 2 of release relay 203 energize the winding of the associated busy relay 204. Contacts 1 of busy relay 204 disconnect resistor 205 and substitutes ground potential on the sleeve wire S on trunk branch TT–1 to establish a holding circuit for the incoming connection; contacts 2 transfer the sleeve conductor of the local trunk branch LT–1 from idle-indicating battery potential to ground potential, such operation being described in connection with local calls.

When the digits of the called number of the subscriber in exchange 9 are dialed, line relay 202 responds to repeat impulses at its contacts 2, whereat the bridge across the outgoing conductors L1 and L2 is momentarily interrupted for each impulse. The slow-restoring release relay 203 remains operated during the repeating of such impulses.

When the connection has been extended to the called line in exchange 9 current flow over the interexchange trunk conductors is reversed by called party answer, thereby reversing the current flow through the lower winding of supervisory relay 201. Supervisory relay 201 thereupon operates, reversing the current flow over the tip and ring conductors of trunk branch TT–1, and consequently over the calling toll trunk ITT to serve any supervisory function.

The toll operator may converse with the called subscriber over the established connection and through the windings of repeat coil 206.

When the receiver is replaced on the called line, supervisory relay 201 restores as the consequent current reversal causes the windings thereof to again oppose each other and the current flow over the tip and ring conductors of branch TT–1 is thereby restored to normal direction.

When the connection is broken at the calling toll board TB, line relay 202 restores and at its contacts 2, opens the bridge across the outgoing trunk and at its contacts 1 open-circuits release relay 203. Release relay 203 restores shortly thereafter, its contacts 1 opening the local winding of supervisory relay 201, and its contacts 2 releasing busy relay 204.

Busy relay 204 restores and at its contacts 1 and 2 again extend battery potential from current-limiting resistor 205 to the sleeve conductors S of the toll and local trunk branches TT–1 and LT–1, indicating that trunk repeater OT–1 is idle.

*Line 822 calls exchange 9*

Sleeve conductor S of the local trunk branch LT–1 is normally supplied with idle-indicating battery potential through break contacts 2 of busy relay 204, break contacts 1 of normally-operated control relay 212 and resistor 205, enabling outgoing repeater OR–1 to be seized over the local trunk branch in the manner described for its seizure over the toll trunk branch.

When the local trunk branch LT–1 is seized by the hereinbefore described extension of a connection from calling line 822 through the associated line circuit LC–1, contacts of the associated finder switch FS–1, and contacts on the hundreds selector HS1, the loop across the tip and ring conductors T and R is extended to the battery and ground connected windings of line relay 202 through break contacts 1 and 2 of supervisory relay 201.

At such time, the operation of outgoing repeater OR–1 is as hereinbefore described with reference to a call received over the toll branch of TT-1 as the tip and ring conductors of both the branches are multiplied together.

Responsive to the operation of the busy relay 204 as hereinbefore noted, contacts 2 of relay 204 ground the sleeve conductor S of the local trunk branch LT-1 and remove the idle-indicating battery potential therefrom. At the same time, contacts 1 remove the idle-indicating battery potential from the sleeve conductor of the toll trunk branch and substitutes a ground potential thereon thereby indicating to the toll trunk branch TT-1 that such outgoing repeater is busy.

The operation of outgoing repeater OR-1 in extending the connection to the desired called line is similar to that described for a toll-originated call.

Upon completion of the call, outgoing repeater OR-1 is restored to normal, and busy relay 204 again extends idle-indicating battery potential to the sleeve conductors of both the toll trunk branch TT-1 and the local trunk branch LT-1 indicating to both that repeater OR-1 is idle.

*Trunk reserve provision*

In Fig. 2 of the drawings, it will be observed that contacts 3 and 4 of each of the busy relays 204 of the outgoing repeaters OR-1 to OR-10 are chained to control the operation of control relay 212 to provide trunk reserve provisions. The operation of the system in reserving trunks for toll purposes will now be described.

In Fig. 2 of the drawings, the repeaters are so arranged to reserve one trunk for toll purposes when all trunks excepting that one is busy.

Control relay 212 at its normally-closed contacts 1 to 10 connect the sleeve conductor of the associated local trunk branches to respective current-limiting resistors of associated repeaters. Operation of relay 212 open-circuits the sleeve conductor of the local trunk branches thereby rendering the associated repeater busy to all locally originated calls. In this manner, with the reserve provisions being arranged to reserve one trunk for toll purposes, when all repeaters excepting one are busy, relay 212 operates and at its break contacts 1 to 10, disconnect all of the sleeve conductors of the local trunk branches from their respective idle-indicating battery potentials, thereby marking them busy to the battery-searching selectors HS1 or ITS. Under such circumstances, with one outgoing repeater being idle and the sleeve conductor of the associated local branch being marked busy, the idle repeater can be seized only over the toll trunk branch.

It will be observed that the chained contacts on the busy relays of the ten indicated repeaters comprise two normally-open separate chains A and B with the battery-connected winding of control relay 212 being connected to one end of both chains and ground potential being connected to the other ends of the chains. At each busy relay, the two chains are connected together by break contacts to complete a circuit from the grounded end of the chains to operate the control relay 212 under certain conditions.

When all trunks are idle, the battery-connected winding of control relay 212, connected to branches A0 and B0 of the chains is open at make contacts 3 and 4 of the first busy relay of outgoing repeater OR-1 and is disconnected from branch B2 at contacts 3 of the busy relay of the second outgoing repeater. Under such circumstances, when all trunks are idle, control relay 212 is restored as illustrated.

Assuming all trunks excepting one to be busy, ground potential originating at the last repeater is extended through make contacts 3 and 4 of each relay succeeding the relay associated with the idle repeater. Break contacts 3 of the unoperated busy relay associated with the idle repeater extends the ground from the B chain to the A chain from whence contacts 3 and 4 of all relays preceding the unoperated one extend such ground potential to the battery-connected winding of relay 212. Relay 212 thereupon operates and at its contacts 1 to 10 removes the idle-indicating battery potential from the local trunk branch of the idle trunk, thereby permitting such trunk to be seized only over the toll trunk branch.

When all trunks are busy, busy relay 204 of each repeater being operated, the ground potential from the remote end of the chains is extended through make contacts 3 and 4 of each of the busy relays of repeaters OR-1 to OR-10 to the battery-connected winding of control relay 212, maintaining it operated. For example, with relay 212 operated and one trunk reserved for toll calls, if a toll call takes the last idle reserve trunk for use, the associated busy relay thereupon operates and completes the noted connection to relay 212. Relay 212 is thereby maintained operated and the sleeve conductors of each of the trunk branches of all trunks are marked busy.

Responsive to one trunk becoming idle after an all-trunk-busy condition, the operate circuit of relay 212 reverts to its originally-traced operate circuit and such idle trunk is thereupon reserved for toll purposes in the manner hereinbefore described. In this way, when all trunks are busy except one, that idle one is reserved for toll purposes and when any trunk becomes idle after an all-busy-trunk condition, such idle trunk is then immediately reserved for toll purposes.

SECOND EMBODIMENT

Figure 3:
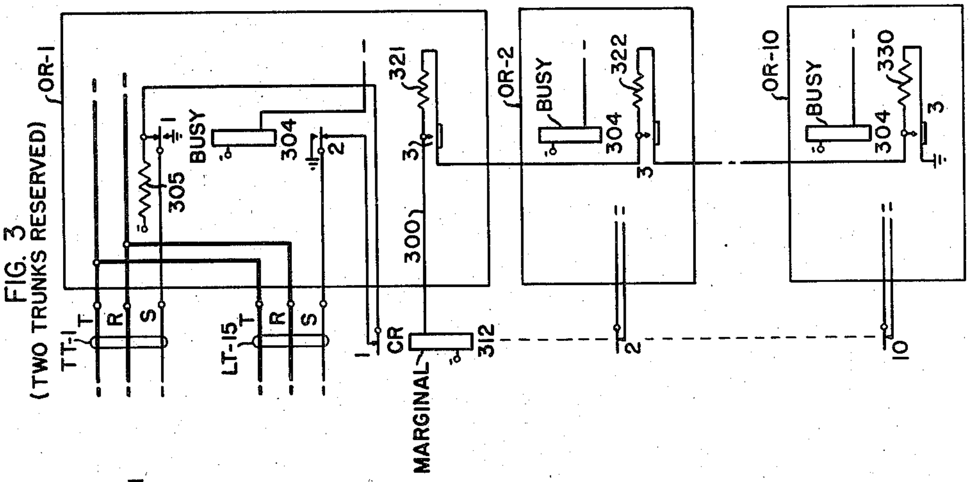
Fig. 3 shows a desirable modification of the control circuits of Fig. 2.

Referring now to Fig. 3 of the drawings, a desirable modification of the trunk reserving arrangement is disclosed.

In Fig. 3, the trunk reserve provision becomes effective when all trunks excepting two are busy. The operation of the control apparatus in providing such provisions will now be described.

Busy relay 304 is the equivalent of busy relay 204 of Fig. 2 excepting that contacts 3 and 4 of relay 204 are replaced by make contacts 3 and an associated resistor such as 321.

Control relay 312 of Fig. 3 is made marginal so that when two resistors are connected in series with its operate path it operates and remains operated until additional resistance is added to its operate path. In this manner, a simple and reliable arrangement can be economically provided.

Assuming only one repeater OR-1 of the ten indicated repeaters to be busy, ground potential from make contacts 3 of the last outgoing repeater is extended through the current limiting resistors 330 to 322 and through closed contacts 3 of relay 304 of repeater OR-1 to the battery-connected winding of control relay 312. At such time, the current flow thereover is so limited that marginal relay 312 fails to operate.

Assuming all trunks except two to be busy, ground potential is extended through the closed contacts 3 of each of the operated busy relay and through the current-limiting resistors associated with contacts 3 of the two unoperated busy relays in series with wire 300 which extends to battery through the winding of marginal relay 312. As hereinbefore noted, the current flow thereover is of sufficient value to operate relay 312. At its break contacts 1 to 10, relay 312 disconnects the idle-indicating battery potential from the sleeve conductors of the two trunk branches of the associated two idle trunks. In this manner, these two trunks are reserved for toll purposes because the idle-indicating battery from current-limiting resistor 305 appears on the toll branches of only these trunks.

Assuming one of the reserved trunks to be taken for toll purposes, the associated busy relay 304 thereupon operates and short-circuits the associated resistance at its make contacts 3. The current flow through the winding of marginal relay 312 is now of a higher value thereby maintaining marginal relay 312 operated and maintaining the other idle trunk reserved for toll purposes.

At such time, in the event that any other trunk becomes idle, such trunk is immediately included in the group of trunks reserved for toll purposes, as relay 312 is still held operated.

Assuming all trunks to be busy, ground is directly connected through the series make contacts 3 of the busy relays of each of the outgoing repeaters, maintaining marginal relay 312 operated. Under such conditions, relay 312 remains operated until more than two trunks become idle, the first two trunks becoming idle being reserved for toll purposes.

THIRD EMBODIMENT

Referring now to Fig. 4 of the drawings, a desirable modification of the control apparatus of Fig. 3 is shown. In Fig. 4, relay 312 of Fig. 3 is replaced by relays 412 and 413, with the control wire 300 of Fig. 3 being connected to relay 413 through break contacts 11 of relay 412. Relay 413 is a marginal relay similar to relay 312 of Fig. 3 and is adjusted to operate in series with two resistors such as 321.

Ground appearing on wire 300 in series with two current-limiting resistors is extended through break contacts 11 of relay 412 to the battery-connected winding of relay 413. Relay 413 operates and at its make contacts operates relay 412. Relay 412, at its break contacts 1 to 10, opens the idle-indicating battery potential from the sleeve conductors of the local branches of all trunks and at its break contacts 11 opens the initial operate circuit of relay 413. Current-limiting resistor 431 is now inserted in series therewith but it is of such value that relay 413 is held operated at reduced current. Accordingly, relay 413 is rendered more sensitive to resistance changes and is now a relatively fast-restoring relay.

When more trunks then two become idle, the resistance in the operate circuit of relay 413 is increased and relay 413 restores. Relay 413 restores relay 412 which at its contacts 1 to 11 reapply idle-indicating battery potential to the local trunk branches of the idle repeaters.

I claim:

1. In a switching system, a group of lines, switching apparatus for completing connections to respective idle ones of said lines, any said connection being either a first-class connection or a second-class connection, means responsive to any said connection for marking the connected line busy to the switching apparatus as regards both first-class and second-class connections, occupancy-indicating means common to all of said lines and means controllable similarly from each of the said lines for operating it responsive to a predetermined portion of the lines being in use, and means controlled by the occupancy-indicating means for marking the remaining idle lines of the group busy to the switching apparatus as regards second-class connections while leaving them marked idle to the switching apparatus as regards first-class connections.

2. In a switching system according to claim 1, wherein the means for marking the remaining lines busy as regards second-class connections is maintained effective until less than the predetermined portion of the lines is in use.

3. In a switching system according to claim 1, each line having a first-class test conductor and a second-class test conductor, the switching apparatus including means for testing the test conductors of the class corresponding to the class of the connection to be made, the means for marking any connected line busy as regards connections of both classes comprising means for placing a busy marking on both test conductors of any connected line, and the means for marking remaining idle lines busy as regards second-class connections comprising means for placing a busy marking selectively on the second-class test conductors thereof.

4. In a switching system according to claim 3, means associated with the switching apparatus and lines providing a first-class and a second-class branch for each line, the switching apparatus including means for connecting with any idle line over the branch thereof which corresponds to the class of the connection being made.

5. In a switching system according to claim 3, the switching apparatus including a first-class group and a second-class group of switching apparatus for making the connections of the two classes respectively.

6. In a switching system according to claim 1, wherein the said predetermined portion includes all but one of the lines of the group, and the said means for operating the occupancy-indicating means includes an electroresponsive device and an energizing circuit therefor, a series of groups of sets of contact pairs corresponding respectively to the lines, means for actuating any group of contact sets for the duration of a connection to the associated line, the energized circuit including first and second control conductors which must be joined to complete it, first circuit means for extending the first control conductor toward the second in a given direction through the series of groups by way of a first chain which includes a set of normally open contacts in each group preceding the last, circuit means for extending the second control conductor toward the first in the opposite direction through the series of groups by way of a second chain which includes a set of normally open contacts in each group succeeding the first, each group of contact sets including a set of normally closed contacts connecting the immediately preceding portion of the first chain to the immediately succeeding portion of the second chain, whereby the two control conductors are joined together by any last said set subject to its associated line being free when all other lines are in use.

7. In a switching system according to claim 6, circuit means for extending the remote end of one chain through normally open contacts in the remaining group of contact sets to the other control conductor, whereby the control conductors are also joined when all lines are in use.

8. In a switching system according to claim 1, wherein the said predetermined portion of the lines includes all of them but two, the said means for operating the occupancy-indicating means including a marginal electroresponsive device and an operating circuit therefor, said circuit including resistors corresponding respectively to the lines, and contact means for selectively connecting the resistors into the operating circuit according to whether the respective lines are in use or not.

References Cited in the file of this patent

UNITED STATES PATENTS

| | | |
|---|---|---|
| 2,416,711 | Myers | Mar. 4, 1947 |
| 2,421,919 | Avery | June 10, 1947 |
| 2,530,845 | Voss et al. | Nov. 21, 1950 |
| 2,725,427 | Murray | Nov. 29, 1955 |